Patented Nov. 19, 1929

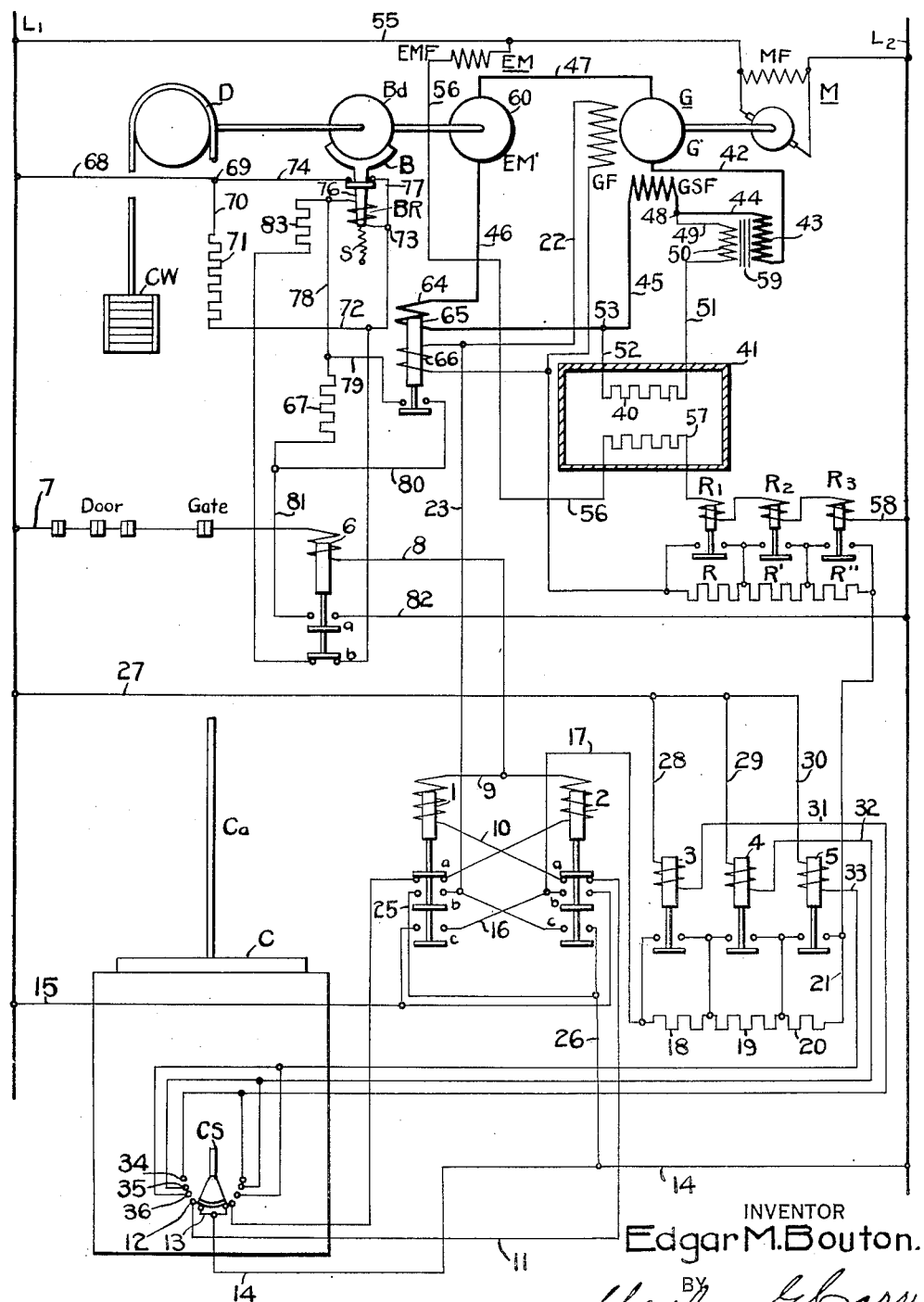

1,736,481

UNITED STATES PATENT OFFICE

EDGAR M. BOUTON, OF CHICAGO, ILLINOIS, ASSIGNOR TO WESTINGHOUSE ELECTRIC & MANUFACTURING COMPANY, A CORPORATION OF PENNSYLVANIA

MOTOR-CONTROL SYSTEM

Application filed November 17, 1927. Serial No. 233,881.

My invention relates to control systems for motors and it has special relation to motor systems for elevators, hoists and similar machinery.

In certain classes of machinery, it is essential that the operative speeds of the driving motor shall be substantially constant at all times. It is well known that the motor speed will be affected by variations in any of a plurality of conditions surrounding the operation of the motor, among which, for example, are variations in the load placed upon the motor and variations in the temperature of the atmosphere in which the motor is operated.

It has been suggested that the motor be connected, for operation, by a generator of the compound-wound type wherein the normal compounding of the generator will compensate for certain of the changes of conditions which would otherwise cause changes of speed. It is an object of my invention, therefore, to add to such a system, devices for maintaining the speed of the motor constant under variations of temperature of the surroundings of the motor and the generator.

A second object of my invention is to provide means, for a motor operated by a generator, for compensating for temperature variations in the several motor and generator circuits.

A further object of my invention is to provide, in a system of the class described in the preceding paragraph, means for compensating for variations in the temperature of the iron in both the motor and the generator.

Another object of my invention is to provide a motor-generator control system with means for varying the compounding of the generator in accordance with changes in temperature or loading conditions, to thus maintain the motor speed substantially constant.

A further object of my invention is to provide means for stopping a motor-driven machine smoothly and rapidly, regardless of the load upon the motor.

Still another object of my invention is to provide means for stopping a motor-driven machine, which stopping means will be rendered variably effective in accordance with the load upon the motor.

A further object of my invention is to provide means for stopping a motor-driven machine of the type wherein a motor is controlled by a compound-wound generator, whereby the current in the generator series field winding will be caused to vary the braking or stopping effect in accordance with the load on the motor.

In motor-control systems of the variable-voltage type, wherein the speed and direction of operation of the motor is controlled by variations in field strength of a driving generator, it is common to provide a series field winding on the generator for the purpose of regulating the speed of the motor in accordance with the load on the motor, thus imparting to the system a constant-speed characteristic which is extremely desirable in certain classes of machinery. This construction, however, is not sufficient to maintain an accurate regulation of the motor speed, since, when both the motor and the generator are cold, as upon the initial starting operation of the system, it will be found that the motor speed, with a given excitation of the generator field windings, will be somewhat less than the speed of the motor, with the same generator field excitation, when the apparatus is warm. In other words, upon initially starting a system of this character, the normal speed of the motor will be less than that after the system has been in operation for a few hours.

It is also well recognized that changes in the temperature of the atmosphere surrounding such a motor-generator system will cause variations in the motor speed by reason of variations of the effective resistance values in the motor and generator circuits.

In certain motor systems, of which elevators may be considered a striking example, accuracy of motor speed under varying conditions is essential, and my invention provides means for maintaining the motor speed substantially constant under variations of the above-named conditions.

My invention will be described with reference to the accompanying drawing, wherein the sole figure is a diagrammatic view of an elevator-control system of the variable-voltage type embodying my invention.

Referring to Fig. 1, I have shown an elevator car C supported by a cable Ca, which passes over a driving drum D to a suitable counter weight Cw. The hoisting drum D is directly coupled to the armature EM' of a shunt wound motor EM, the shunt field winding E. M. F. of which is permanently connected to a source of energy, illustrated as two supply lines L¹ and L². The armature EM' of the motor EM is connected in loop circuit with the armature G' of a generator G. The generator G is preferably of the compound wound type and is provided with a shunt field winding GF and a series field winding GSF. The generator G has its armature G' directly coupled to the armature M' of a driving motor M, which is preferably of the shunt-wound type, having its shunt field winding MF connected to the supply lines L¹ and L². The direction of rotation of the elevator motor EM is controlled through the operation of an "up" direction switch 1 and a "down" direction switch 2, which switches function to reverse the connections of the generator shunt field winding GF to the source of supply.

The speed of the motor EM' is controlled in steps through the operation of a series of speed relays 3, 4 and 5, the function of which is to include certain resistor sections in, or exclude them from, the generator shunt field winding circuit.

A car switch CS, mounted upon the elevator car C, is manipulated to control the direction switches 1 and 2 and the speed relays 3, 4 and 5. In order to stop the elevator car C and to maintain the car stationary when stopped, I provide a brake B, normally pressed into engagement with a brake drum Bd by a spring S. A coil BR, illustrated as a solenoid, is provided for withdrawing the brake B from engagement with the brake drum Bd. The coil BR is controlled through the operation of a relay 6.

Assuming that it is desired to start the car upwardly, the car switch CS may be moved to the left to establish a circuit for the "up" direction switch 1 extending from line conductor L¹ through conductor 7, gate and door switches, as indicated by the legends, the coil of brake relay 6, conductors 8 and 9, the coil of "up" direction switch 1, conductor 10, normally closed contact members a of "down" direction switch 2 (forming an interlock between the two direction switches), conductor 11, contact members 12 and 13 on car switch CS and conductor 14 to line conductor L².

The "up" direction switch 1 closes its contact members b and c, thereby establishing a circuit for exciting the generator shunt field winding GF with current in one direction, the circuit extending from line conductor L¹, through conductors 15 and 16, contact members c of "up" direction switch 1, conductors 16 and 17, resistor sections 18, 19 and 20, conductor 21, resistor sections R, R' and R", the generator shunt field winding GF, conductors 22 and 23, contact members b of "up" direction switch 1, and conductors 25, 26 and 14 to line conductor L².

A further movement of the car switch CS to the left completes circuits for energizing the speed relays 3, 4 and 5, the circuits extending from line conductor L¹, through conductors 27, 28, 29 and 30, the coils of relays 3, 4 and 5, respectively, conductors 31, 32 and 33 to contact members 34, 35 and 36, respectively, and thence from each of these relays, through the car switch contact member 13 and conductor 14, to line conductor L². The consequent operation of the speed relays 3, 4 and 5 shunts the resistor sections 18, 19 and 20 from the generator-field-winding circuit, and causes the motor EM to operate at a higher speed.

The energizing of the brake relay 6 operates the brake-releasing coil BR, as the direction switch 1 is energized, and thus permits the elevator motor EM' to run freely.

Under normal conditions of operation, the current in the generator series field winding GSF will be proportional to the load on the elevator car C, and, in this manner, the speed of the motor EM will remain substantially constant under variations of loading of the elevator car C.

The circuit for the generator series field winding GSF extends from the generator armature G' through conductor 42, coil 43 of (the purpose of which is hereinafter described), conductor 44, generator series field winding GSF, conductor 45, the coil of relay 64 (the purpose of which is hereinafter described) conductor 46, the armature EM' of the elevator motor EM and conductor 47 to the opposite side of the generator armature G'. Connected in shunt relation to the generator series field winding is a resister 40, the circuit for which extends from one terminal of field winding GSF through junction-point 48, conductor 49, a coil 50 of (the purpose of which is hereinafter explained), conductor 51, resistor 40, conductor 52, and junction-point 53 to the other terminal of field winding GSF.

The resistor 40 is made of some metal having a positive temperature coefficient and is surrounded by a housing 41 of metal so designed as to have a capacity for absorbing heat equal to the heat-absorbing capacity of the motor and generator iron, so as to be affected in accordance with the temperature of the motor and generator iron. As may be readily understood, the resistor 40 will be affected by variations in room temperature in the same degree as, or proportionally to the effect upon, the motor and generator, and the effective resistance value of resistor 40 will be varied to allow more current to flow in the generator series field winding GSF as the motor armature increases in temperature and to allow less current to flow through the series field winding when the motor armature is cold.

When the motor is cold, the armature circuit has a lower inherent resistance value than when the motor is warm and, to maintain good speed regulation, this variation of resistance values must be compensated by an equivalent variation in the effective resistance value of the remainder of the series field circuit of the generator. Thus, the resistor 40 varies the compounding of the generator G in accordance with variations in temperature in the motor, regardless of whether the variations are caused by changes in the ambient room temperature or by the heat generated in the windings of the motor.

As a means for further compensating for the variations in the temperature of the motor EM, I have provided a resistor 57 in circuit with the motor field winding E. M. F., the resistor being enclosed in the housing 41 for resistor 40. The effect of the resistor 57 will be to vary the compounding of the generator G in accordance with changes in the temperature of the field winding of the motor EM. When the motor EM is cold, the resistance of the field winding E. M. F. is less than that when the motor is warm. Therefore, when the motor is originally started, the field current will be high, and, as the motor warms up, this field current will gradually decrease by reason of the increased resistance of the winding E. M. F., whereby the speed of the motor will tend to increase. Since the circuit for the field winding E..M. F. extends from line conductor $L^1$ through conductor 55, the field winding E. M. F., conductor 56, resistor 57, the coils of relays $R^1$, $R^2$, and $R^3$ (the purpose of which is hereinafter described) and conductor 58 to line conductor $L^2$, it follows that the resistor 57 will be traversed by current of a greater value when the motor is cold and of lesser value when the motor is warm. By enclosing resistor 57 with resistor 40, the heat produced by resistor 57 will cause equivalent changes in the effective resistance of resistor 40.

The resistor 57 will, therefore, cause the effective resistance of the resistor 40 to be relatively high when the motor is cold, thus increasing the compounding of the generator to supply a proportionately higher initial voltage to the armature EM'; but, when the motor warms up, the heating effect of the resistor 57 is reduced, and the compounding of the generator is also reduced, causing a lower voltage to be supplied to the armature EM'. In this way, the speed of the motor EM will be maintained substantially constant, under variations of temperature.

As a further means for compensating for changes of temperature in the motor field winding, I have illustrated the resistors R, R' and R'', normally in series relation with the generator separately-excited field winding GF, and a relay associated with each of these resistors, the coils of which are connected in series relation with each other and with the resistor 57 and the hoisting motor field winding E. M. F. These relays are designated as $R^1$, $R^2$ and $R^3$, respectively. By designing these relays with characteristics such that $R^1$ will be picked up when a small amount of current flows through its coil, $R^2$ will be picked up when a greater amount of current flows through its coil and $R^3$ will be picked up when a still greater current flows through its coil, the effect of these relays will be as follows. When the motor field winding E. M. F. is cold, its resistance value will be smaller than when it is warm. Consequently, upon the initial starting of the elevator motor, a sufficient amount of current will pass though relays $R^1$, $R^2$ and $R^3$ to cause all three of these relays to be energized, thus excluding the resistors R, R' and R'' from the circuit of the motor field winding E. M. F. As the field winding E. M. F. increases in temperature and, consequently, increases its effective resistance value, the current traversing the coils of the relays $R^1$, $R^2$ and $R^3$ will be decreased, for example, to such value that the relay $R^3$ will drop out, thereby inserting the resistor R'' in the circuit for the generator separately-excited field winding GF. The consequent reduction in voltage generated by the generator G will, therefore, compensate for the weakened field flux in the motor EM, and the speed of the motor will remain constant. As the temperature of the winding E. M. F. is further increased, relays $R^2$ and $R^1$ will be deenergized in order, and resistors R' and R will be successively inserted in the circuit for the generator winding GF to produce proper field compensation.

By reason of sudden increases in load or rapid variations in the excitation of the generator field winding, it sometimes happens that a rapid increase or decrease of the motor-armature current is occasioned. Such variations obviously tend to cause a variation in the speed of the motor and, in order to compensate for such variations and thus maintain the motor speed constant, I have provided a pair of coils 43 and 50, wound in opposition upon a suitable core 59 to form a structure somewhat in the nature of a transformer. The coil 43 is connected in series relation with the generator series field winding GSF and is thus affected by variations in current in the motor-armature circuit, while the coil 50 is connected in series relation with the resistor 40 and in shunt to the generator series field winding, and is thus also affected by changes in the current in the generator series field winding.

As may be readily seen, variations in the field strength of the generator G or increases in the motor armature current, through the effect of the generator series field winding, tend to further increase or decrease such variations; and, in order to compensate for this condition, the varying current in the coil 43 will induce, in the coil 50, a proportionate and opposite current, which will be supplied to the motor armature circuit, thus quenching the effect of variation of the generator field strength.

Another condition which affects the successful operation of motor systems is the effect of varying motor load conditions upon the rapidity with which the motor may be stopped. In elevator application, it is very desirable that the motor may be stopped accurately within a short traveling distance after the car switch is centered.

In order to accomplish this rapid deceleration, it has been proposed to permit the regenerative current flowing through the circuit for the motor armature EM' and the generator armature G' to cause regenerative braking, through the effect of this flow of current in the series field winding GSF. However, under certain conditions of load on the elevator car C, this regenerative current becomes extremely great, for example, when the elevator is operating under overhauling-load conditions. In such instances, the regenerative current may become so great as to decelerate the motor too rapidly, thereby producing an unpleasant jerky deceleration. In fact, it sometimes occurs that this regenerative current is so great as to cause a complete reversal of the field of the generator G, thus causing the elevator car to be stopped and started in the reverse direction. To overcome this unpleasant condition, I propose to partially apply the brake during the period of deceleration, when the regenerative current value exceeds a predetermined amount, thus permitting the mechanical brake to absorb a portion of the dynamic energy to be dissipated in stopping the motor and hence avoid the necessity of having the generator absorb all of this dynamic energy.

To accomplish this result, I have illustrated a relay 64 provided with two energizing coils designated respectively by the reference characters 65 and 66. The coil 65 is connected in circuit with the generator armature G and the motor armature EM' in order that energization of the coil 65 may be varied in proportion to the current flowing in the motor-armature circuit. The coil 66 for relay 64 is connected in parallel relation to the generator separately-excited field winding GF, to be thereby effectively energized at all times during which the winding GF is supplied with current. By suitably arranging the coils 65 and 66 so that, during normal operating conditions, the effects of the two coils will be to aid each other, it is obvious that the relay 64 will be actuated at all times during the starting and running of the elevator car C.

When the car C is to be stopped, the car switch is returned to its first position, that is, to such position as will complete circuits through contact members 12 and 13 on the car switch CS. Under these conditions, the coil 66 will remain effectively energized by current flowing in the same direction as when the car switch was positioned for normal running. However, speed relays 3, 4 and 5 will be opened, weakening the excitation of the field winding GF. At this instant, the motor armature EM' will be operating at a speed in excess of its normal speed for the value of generator field excitation now supplied. Therefore, a regenerative current now flows through the coil 65, causing this coil to "buck" or oppose the effect of coil 66. The coils 65 and 66 may be so selected that any value of regenerative current in excess of a predetermined value which flows through the coil 65 will be effective to overcome the force exerted by the coil 66, whereupon relay 64 will open.

As previously described, the operation of the brake relay 6 energizes the brake-releasing coil BR by way of a circuit which extends from line conductor $L^1$ through conductor 68 to a junction-point 69 where the circuit divides, one branch extending through conductor 70, resistor 71, and conductor 72 to another junction-point 73, and the other branch extending through conductor 74, normally closed contact members 75 on the brake-operating plunger 76, and conductor 77 to junction-point 73, whence the reunited circuit is continued through the brake-releasing coil BR, conductors 78 and 79, the contact members of the relay 64 (now closed, as previously described), conductors 80 and 81, the contact members $a$ of the brake relay 6 and conductor 82 to line conductor $L^2$. It will be noted that this normal circuit for the brake-releasing coil BR excludes resistor 67, which resistor is selected as of such value that its inclusion in the circuit will cause partial setting of the brake.

On the other hand, the effect of the abnormal regenerative current flowing through the circuit of the coil 65 on the relay 64, as previously described, will cause the insertion of the resistor 67 in the circuit for the brake-releasing coil BR to thereby permit the brake B to be supplied to the drum Bd to reduce the motor speed. This condition of partial setting of the brake B will continue until the speed of the motor EM has been reduced to the value which corresponds to the then value of the exciting current in the field winding GF of the generator G, or until the speed is so reduced that the regenerative current falls below the predetermined value selected for the operation of the relay 64. At such time, the relay 64 will again close to exclude resistor 67 from circuit and permit the brake to be completely released. Obviously, the motor will be thereafter stopped in accordance with the usual practice.

A resistor 83 is connected in parallel relation to the brake-releasing coil BR and is controlled by the normally closed contact members b on the brake relay 6, to act as a discharge path when the brake coil BR is deenergized.

The resistor 71, being normally shunted from the brake-releasing circuit through the operation of contact members 75, permits full application of current to the brake-releasing coil to effect rapid withdrawal of the brake B from the drum BD; but, after the brake B is withdrawn, contact members 75 are opened to insert resistor 71 in the circuit of the coil BR, thereby reducing the current normally expended to maintain the brake in releasing condition.

It will thus be seen that I have provided means for compensating for several of the variable conditions under which an elevator-control system is operated, which conditions tend to vary the speed of motor operation and the accuracy with which the travel of the motor may be controlled.

The illustrated embodiment of my invention is a preferred form, but it is obvious that many minor changes may be made. I do not desire, therefore, to be limited to the apparatus shown and described, except as defined by the appended claims.

I claim as my invention:

1. In a control system, a motor, a compound-wound generator for actuating said motor, and means for varying the compounding of said generator in correspondence with variations of the temperature of said motor and generator.

2. In a control system, a motor, a compound-wound generator for actuating said motor, means for maintaining said motor speed substantially constant under varying temperature conditions, said means comprising means for varying compounding of said generator in correspondence with variations in temperature of said motor and generator.

3. In a control system, a motor, a field winding therefor, and means for maintaining said motor speed characteristic substantially constant under variations in the temperature of said motor, said means comprising a resistor, a housing enclosing said resistor of such proportions as to subject said resistor to temperature variations corresponding to the variations of said motor temperature, and means responsive to variations of the temperature of said resistor for correspondingly varying the energy supplied to said motor.

4. In a control system, a motor, a compound-wound generator for actuating said motor, means for maintaining said motor speed substantially constant under varying temperature conditions, said means comprising a resistor connected in shunt relation to the series field winding of said generator and means for subjecting said resistor to temperature variations corresponding to variations in said motor temperature.

5. In a motor-control system, a motor, a compound wound generator for actuating said motor, and means for maintaining the speed characteristics of said motor substantially constant under varying temperatures, said means comprising a resistor having a positive temperature coefficient connected in shunt relation to the series field winding of said generator, a second resistor connected in series relation with the field winding of said motor for varying the temperature of said first resistor and a housing enclosing said resistors of such design and construction as to subject the said resistors to the same variations in temperature as said motor.

6. In a control system, a motor, a compound-wound generator for actuating said motor, means for maintaining said motor speed substantially constant under sudden variations in the current supplied to said motor, said means comprising means independent of the series field winding for said generator for impressing across the series field winding of said generator an opposing electric motive force corresponding to the degree of sudden change in said current.

7. In a control system, a motor, a compound-wound generator for actuating said motor, means for maintaining said motor speed substantially constant under sudden variations in the current supplied to said motor, said means comprising a magnetic core, a coil on said core connected in series relation with the series field winding of said generator, and a second coil on said core, wound in opposition to said first coil and connected in shunt relation to said generator series field winding, whereby sudden changes in the current in said generator series field winding will impress a corresponding electric motive force across said winding opposing said changing current.

In testimony whereof, I have hereunto subscribed by name this 7th day of November, 1927.

EDGAR M. BOUTON.